United States Patent
Calderone et al.

(10) Patent No.: US 8,117,334 B2
(45) Date of Patent: Feb. 14, 2012

(54) SYSTEM AND METHODS FOR WORKFLOW MANAGEMENT

(75) Inventors: Anthony B. Calderone, Matthews, NC (US); Michael Jacobs, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 999 days.

(21) Appl. No.: 10/905,247

(22) Filed: Dec. 22, 2004

(65) Prior Publication Data

US 2006/0167730 A1 Jul. 27, 2006

(51) Int. Cl.
*G06F 15/173* (2006.01)
(52) U.S. Cl. .................................. 709/238; 705/7.26
(58) Field of Classification Search ............ 709/246, 709/238; 707/608; 705/7, 8
See application file for complete search history.

(56) References Cited

U.S. PATENT DOCUMENTS

| | | | |
|---|---|---|---|
| 6,714,979 B1* | 3/2004 | Brandt et al. | 709/225 |
| 2002/0091808 A1* | 7/2002 | Fukasawa et al. | 709/223 |
| 2002/0101848 A1* | 8/2002 | Lee et al. | 370/349 |
| 2004/0088408 A1* | 5/2004 | Tsyganskiy | 709/225 |
| 2005/0021840 A1* | 1/2005 | Niemi | 709/238 |
| 2005/0102393 A1* | 5/2005 | Murray et al. | 709/224 |

* cited by examiner

*Primary Examiner* — Ryan Jakovac
(74) *Attorney, Agent, or Firm* — Moore & Van Allen PLLC; James C. Edwards

(57) ABSTRACT

The workflow management system includes various modules that manipulate incoming messages from a variety of clients, translate and route the messages to the appropriate backend applications, monitor completion by the backend applications and provide responses to the clients. A common database is operatively connected to the applications and modules to manage and monitor the workflow of an enterprise over time and provide support of service.

23 Claims, 4 Drawing Sheets

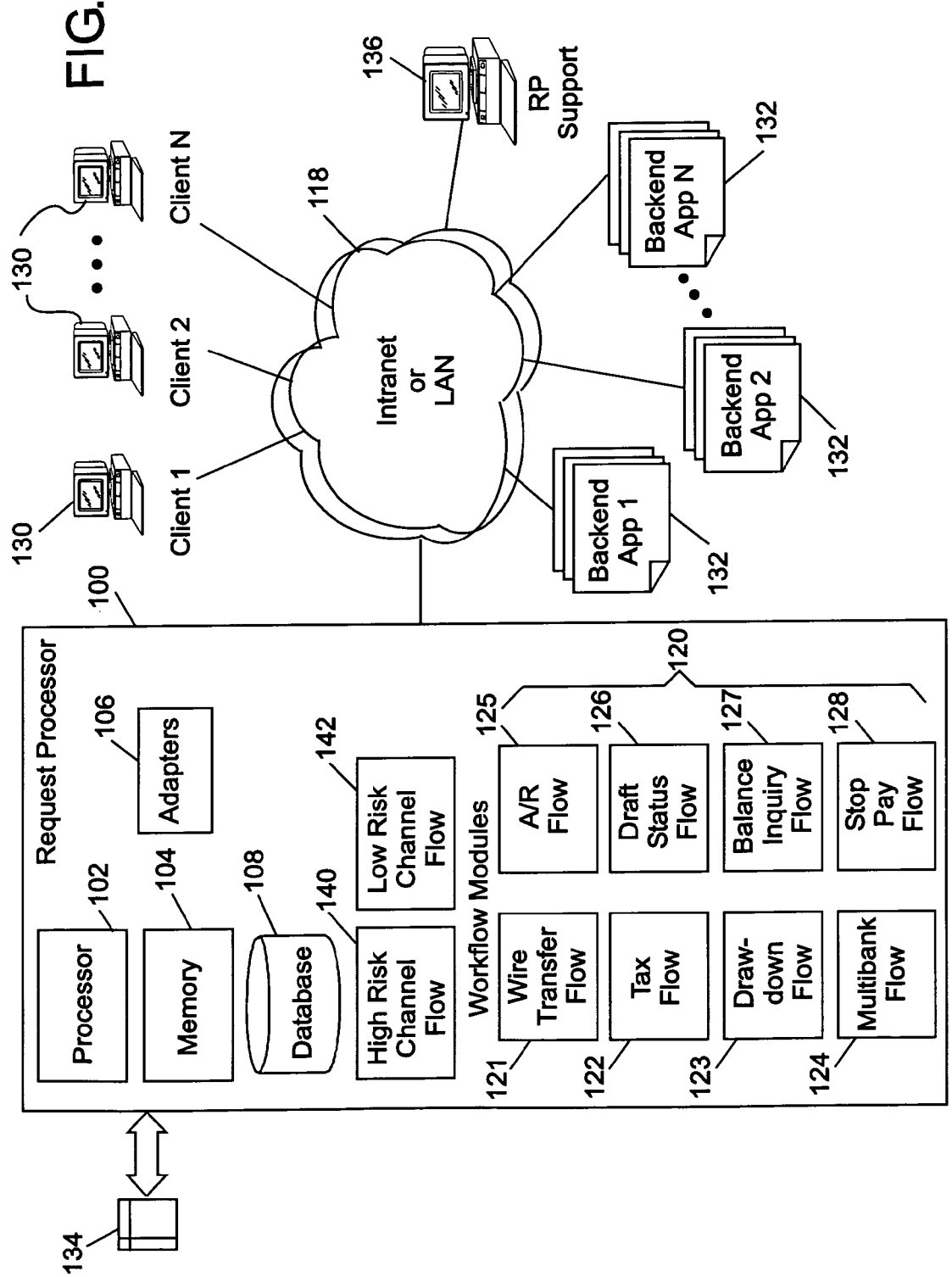

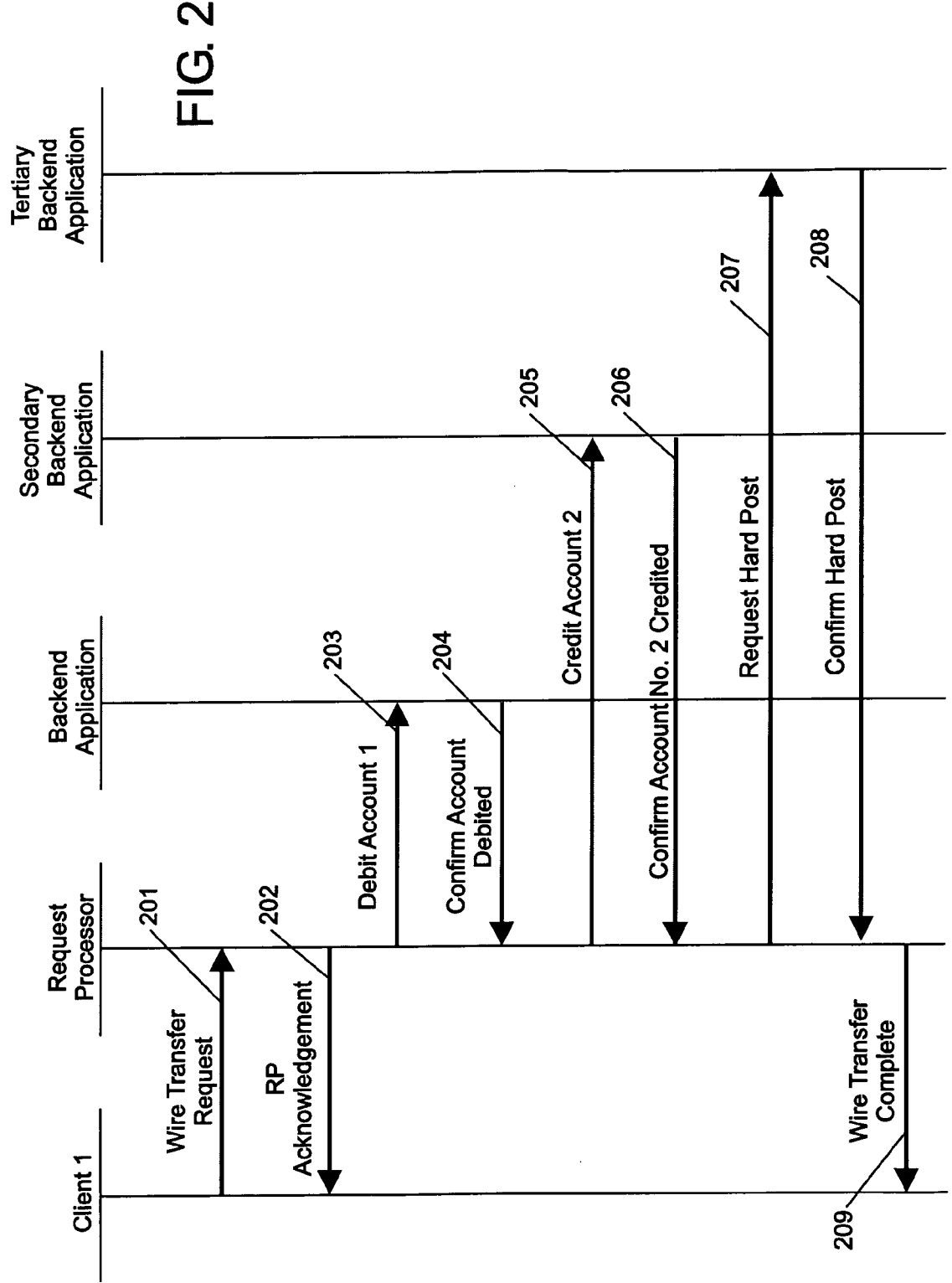

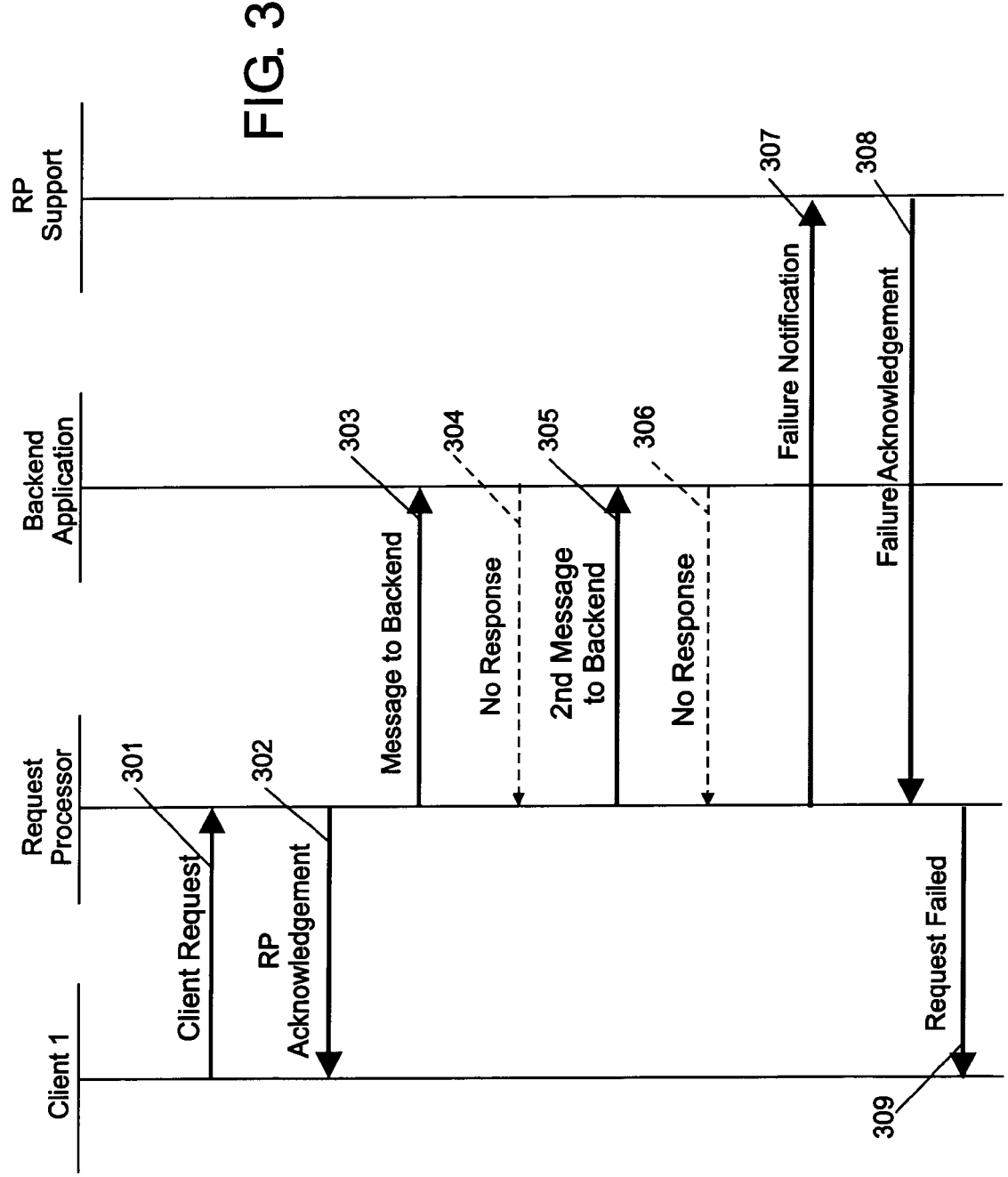

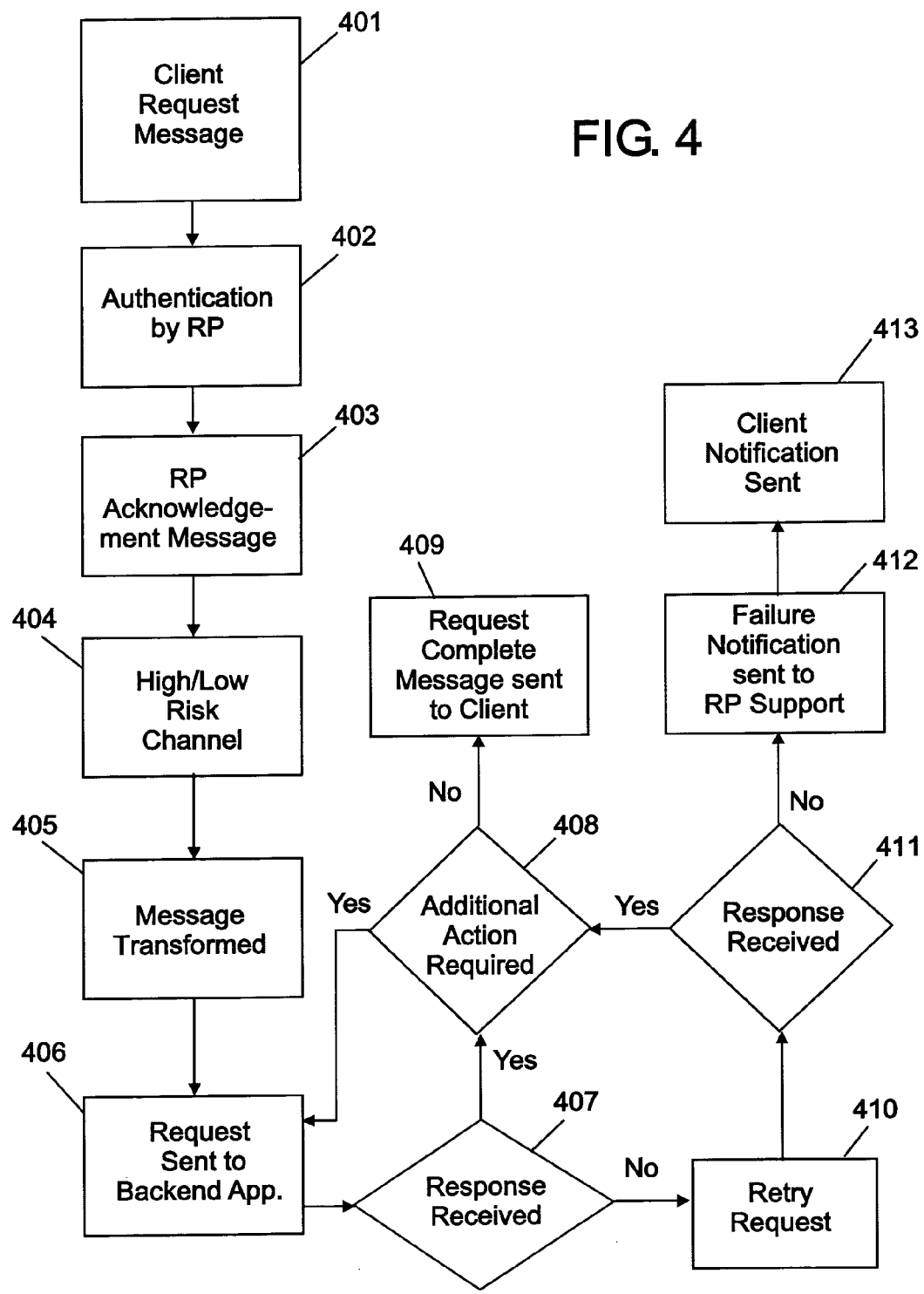

SYSTEM AND METHODS FOR WORKFLOW MANAGEMENT

BACKGROUND

Many institutions must coordinate and manage workflow between a variety of different and potentially incompatible business systems whether due to the integration of new and legacy systems, acquisition or merger of systems, or the interface of internal and external systems where the various systems may use different formats, platforms, logic or the like.

Typically, in known systems, an entity transmitting data to or receiving data from a specific application, must tailor its messaging to conform to the logic and format used by that application. In large businesses where workflow crosses multiple applications each entity must know and understand each application to which it interfaces such that a burden is placed on the interfacing entities to conform to multiple applications. Moreover, the business, organization or individual charged with managing the workflow, must manage a number of disparate and at times incompatible applications and entities such that the workflow cannot be efficiently managed and monitored. For very large and geographically diverse organizations, management of workflow across these disparate systems can create a significant challenge and resource drain.

In order to facilitate communication between different systems, message brokers are known that route, transform and manipulate messages between one or more incompatible applications. These brokers process received messages and transform the messages based on logic defined in the broker's message flows. The transformed messages are then transmitted to other applications that can understand and respond to the transformed message. The broker operates as an interface that allows incompatible applications and systems to communicate based on a set of rules maintained by the message broker. One such system is the WebSphere Business Integration Broker sold by IBM.

While such systems can manipulate message flows they have not been used to manage workflow of an enterprise across a plurality of disparate and incompatible systems.

SUMMARY

The invention provides for workflow management, data validation with a single view of transactions to facilitate support of service. In some embodiments, the invention is described with respect to organizations where the system is implemented across a large enterprise by multiple business units or divisions. However, the principles of the invention can be applied in enterprises of any size. The invention can be adapted to any type of workflow where communication with and among a variety of incompatible applications is required. An example of one such workflow management environment is banking.

In some embodiments the workflow management system of the invention includes various modules, applications, or application modules that manipulate incoming messages from a variety of clients, translate and route the messages to the appropriate backend applications, monitor completion by the backend applications and provide responses to the clients. These can be implemented by a computer system or systems, software, and networks, or by other means, such as paper-based means. In some embodiments, workflow modules control the workflow messaging based on internal logic governing the workflow by translating and routing the received messages to the backend applications that are ultimately responsible for completing the client requests. A common database is operatively connected to the applications and modules to manage and monitor the workflow of an enterprise over time and facilitate support of service.

The workflow management process implemented by the workflow modules preferably includes identifying the type of client request, classifying the request as high or low risk, translating the request to a format that can be understood by the responding backend application and routing the request to the appropriate backend application. The system of the invention interfaces with both the client and the backend application to ensure completion of the request and monitors the workflow activity to perform support services and follow-up analysis. The system allows diverse client systems to integrate with diverse business systems while coordinating and monitoring workflow from a centralized management structure.

In some embodiments, the invention is implemented via a computing platform. A computer program product or products containing computer programs with various instructions cause the hardware to carry out, at least in part, the methods of the invention. Applications, or modules, are operated on a server and the applications are accessed from client workstations and backend applications. A database is operatively connected to the modules to facilitate review, monitoring and support of service. In this computer-based embodiment, the hardware and software together form the means for carrying out the invention.

BRIEF DESCRIPTION OF THE DRAWINGS

FIG. 1 is a block diagram of some of the computing hardware that is used to implement some embodiments of the invention FIG. 2 is a message flow diagram illustrating one implementation of the workflow management system according to one embodiment of the invention.

FIG. 3 is a message flow diagram illustrating another implementation of the workflow management system according to one embodiment of the invention.

FIG. 4 is a flowchart illustrating the operation of the system of the invention.

DETAILED DESCRIPTION OF EXAMPLE EMBODIMENTS

The present invention can most readily be understood by considering the detailed embodiments presented herein. Some of these embodiments are presented in the context of a large enterprise using a corporate intranet to facilitate the carrying out of the task management function; however, these embodiments are examples only. The invention has applicability to any type of task management activity in any type of organization.

The terms "institutional" "enterprise" or "organization" are used to refer to an entity such as a company or association that is making use of the invention. The entity can be large or small.

A "client" is used herein to represent a functional entity defined by the institution that initiates a function, such as a request, to be completed by one or more backend applications of the organization. Typically a "client" will be filled by an individual or team of individuals within the organization that is authorized to initiate the function. The client could however be an entity or individual outside of the business enterprise that is authorized to initiate a function. For example, in the banking industry, therefore, a client could be a branch office of the bank or a bank customer such as an account holder.

A "backend application" is used herein to represent a function or functional entity that responds to one or more requests from a client. A backend application may be part of the organization that manages the system of the invention or it can be a function performed by an entity outside of the organization. For example, in the banking industry, therefore, a backend application could be an internal bank operation for completing an internal transaction between two accounts of the same bank or a transaction involving an unrelated financial or regulatory institution.

The terms, "module", "application module", and in some cases, simply "application" are meant to refer to a specific process that is performed as part of the workflow management system discussed throughout. Often a module corresponds to a software application.

It must be noted that the entire function of the invention, including the common database can be implemented in whole or in part on a single computing platform. The invention can also be implemented partly or completely using paper-based means, in which case forms would replace the various computer entry steps disclosed herein.

FIG. 1 illustrates, in block diagram form, a view of a computer-implemented embodiment of the invention as it might be implemented on a network. FIG. 1 includes a request processor computing platform (RP) 100. Fixed disk storage 108 contains the database. The RP 100 is controlled by a processor 102 which serves as the central processing unit (CPU) for the platform. When the system is operating, the instructions are partially loaded into memory 108 and executed by the CPU 102. Memory 104 is typically divided into multiple types of memory or memory areas such as read-only memory (ROM), and random access memory (RAM). A plurality of general-purpose adapters 106 are provided. At least one, in this example, serves to connect the computing platform to a network 118. The network 118 might be a corporate intranet, or a local area network (LAN). Computer program code instructions for implementing the appropriate application modules are stored in the data base 108 including workflow modules 120. Numerous types of general purpose computer systems and workstations are available and can be used to implement computing platform 100. Available systems include the WebSphere Business Integration Broker sold by IBM run on a UNIX or z/OS system.

The RP 100 is accessed from a plurality of client workstations 130 via network 118. The RP can also access a number of backend applications 132 via network 118. RP support could also be directly connected to RP 100. Finally, RP support 136 can be accessed by the RP over network 118. RP support 136 includes a work station for receiving reports and notifications from RP 100 as will hereinafter be described. RP support 136 is accessed by support personnel to monitor the operation of the system.

In any case, a computer program which implements parts of the invention through the use of a system like that illustrated in FIG. 1 can take the form of a computer program product residing on a computer usable or computer readable storage medium. Such a medium, a diskette, is shown at 134 in FIG. 1. A computer program product containing the program of instructions can be supplied in such a form, and loaded on the machines involved, either directly, or over a network. The medium may also be a stream of information being retrieved when the computer program product is "downloaded" through the Internet. The computer programs can reside on any medium that can contain, store, communicate, propagate, or transport the program for use by or in connection with an instruction execution system, apparatus, or device. The computer-usable or computer-readable medium may be, for example but not limited to, an electronic, magnetic, optical, electromagnetic, infrared, or semiconductor system, apparatus, device, or propagation medium. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The RP 100 includes a first channel flow 140 for receiving high risk requests and a second channel flow 142 for receiving low risk requests. Each request received from a client workstation 130 is identified and is routed to the appropriate channel based on the level of risk associated with the request. The assessment of risk is made by the organization controlling the RP 100 and is based on internal risk assessments. For the high risk flow additional safeguards could be built into the system such as redundancy of equipment and functions, greater security measures, greater bandwidth or the like.

Client requests from clients 130 are processed by one of a number of work flow modules 120 depending on the nature of the request. Each work flow module 120 is responsible for processing those messages that relate to its function and manipulating those messages and transferring the manipulated messages to the appropriate backend application 132. The message is formatted by the work flow module 120 to be compatible with the appropriate backend application. In addition to transforming and transmitting messages from client 130, the workflow modules 120 also include flow logic that defines the steps required to complete the client request. Each work flow module 120 tracks each step in the process necessary to get a response to the client request and automatically initiates a message or series of messages to and from the appropriate backend applications to complete the client request without the need for any additional client involvement.

In the illustrated embodiment, example work flow modules 120 are shown that relate to the banking industry for purposes of explaining the operation of the system of the invention, it is to be understood that the system of the invention could be used in other industries or to perform other functions. Example high risk work flow modules are shown including a wire transfer flow module 121, a tax flow module 122, a drawdown flow module 123 and a multibank flow module 124. Example, low risk work flow modules are the advice to receive flow module 125, draft status update flow module 126, balance inquiry flow module 127 and stop pay module 128.

The backend application 132 to which a message is directed will respond to the message from the RP 100 as if it received the message directly from the client work station 130. In this manner the RP 100 is transparent to the backend applications 132 and clients 130. The response from the backend application is transmitted to the RP 100 and is processed by the appropriate work flow module 120. If the received response is a complete response to the client request, the workflow module 120 will manipulate the message to conform to the format used by the requesting client work station and transmit a message to that client work station indicating that the request has been completed. If the response received from the backend application is not a complete response, the RP 100 will act as an intermediary to obtain a complete response. For example, if, in order to complete the request, further information from or action by a backend application is needed, the flow logic in the relevant workflow module will receive the message from the backend application and will recognize it as an incomplete response. The flow logic of the work flow module will identify the further information or activity required based on the received message and will automatically format the next message and transmit it to the appropriate secondary backend application. Upon receiving a response from the secondary backend application it will repeat the process until a complete response is received. As used herein the "secondary" backend application could be the original backend application or a different backend application. The term "secondary" is used to identify the backend application that receives a second request message from the work flow module for the original client request. The workflow modules can send additional messages to tertiary or higher order backend applications as needed to complete the client request. Once a complete response is received, the RP 100 will transmit a request complete message to the requesting client. Thus, not only does the RP 100 act as an interface between incompatible systems it also facilitates the completion of client requests.

Operation of the system will be described using a specific banking industry example of a request by a client for a wire transfer. Reference is made to the message diagram of FIG. 2 and the flow chart of FIG. 4. The wire transfer request is initiated by a client from, for example, a work station 130, where work station 130 could be at a branch office of the bank, and received at RP 100 (block 401). A wire transfer request message 201 including an identification of the date, the account to be debited, the account to be credited, the amount of the transfer and an authorization key is sent from the client to the RP 100. The request for a wire transfer is authenticated as to source, date and accounts (block 402). An acknowledgement message 202 is sent from the RP to the requesting client work station (block 403). The request is further identified by the RP as a high risk channel flow request or a low risk channel flow request based on the nature of the request (block 404). In the present example the request is assigned to a high risk channel. Message 201 is then transformed by the wire transfer flow module 121 based on its internal logic to a format compatible with the relevant backend wire transfer application (block 405). A message 203 is sent from the RP to the backend wire transfer application 132 that handles wire transfers instructing the backend application to debit a first account (block 406). After debiting the identified account, the backend wire transfer application sends a response message 204 to the RP confirming that it has debited the specified amount from the appropriate account. The wire transfer flow module 121 receives the confirmation message 204 (block 407). The wire transfer flow module 121, in response to the debit notice message, determines, from its internal flow logic, what additional action is required (block 408). In the present example, the internal flow logic of the wire transfer flow module 121 would indicate that the request is not completed and that further action is required. In response the RP sends message 205 to the secondary backend application to credit the appropriate account (block 408). The secondary backend application sends a message 206 to the RP confirming it that the appropriate account has been debited (block 406). In response to this confirmation message, the wire transfer flow module 121, based on its internal flow logic, sends message 207 requesting a hard post of the wire transfer to a tertiary backend application (block 408). The tertiary backend application responds with a message 208 to the wire flow transfer module 121 confirming that the hard post is completed (block 407). This message by the tertiary backend application confirming that the request for a wire transfer has been completed is the final step in the internal flow logic of wire transfer flow module indicating that the desired wire transfer has been completed. In response the wire transfer flow module 121 sends a message 209 to the originating client work station confirming that the wire transfer has been successful (block 409). It will be appreciated that the client was not involved in the intermediate messaging because responsibility for all intermediate steps was taken over by the RP. The client simply made the original request and was not involved in the process until it received a notice that the wire transfer was complete.

Because the RP assumes responsibility for completion of client requests, it is necessary that the work flow be monitored to ensure that the request is completed in the event of a failure to complete. Initial responsibility for completion lies with the work flow module that handles the request. Referring to FIG. 3, messages 301, 302 and 303 correspond to messages 201, 202 and 203 as previously described with respect to FIG. 2. The work flow module tracks each request and includes logic for determining if a request has been completed in a timely manner (block 407). The time for completing a request will vary with the type of request but the work flow module's internal logic sets an expected time for receipt of a response. If no response message 304 is received during the expected response time, the work flow module can reinitiate the request by resending a copy of the original request message 305 (block 410).

If no response message 306 is received in response to this second request (block 411), a message 307 is sent from the work flow application to RP support 131 indicating that a request has failed (block 412). RP support responds with message 308 to the RP acknowledging the failed request. In response the RP sends message 309 to the client work station with a request failed message (block 413). The RP support personnel can then investigate the failure and take appropriate remedial action including revision of the work flow application logic or the like. Additionally, RP support is responsible for fulfilling the original request whether by a manual request or otherwise.

To monitor the workflow, the workflow activity of each application module is stored in the system transaction repository in data base 108. Once the responses are captured in data base 108 the data can be retrieved by the enterprise to review and monitor the work flow through the system. For example, the data might be used to determine the average time to complete a particular request, the relative frequency of various types of requests or the like.

Likewise, the reports can be used to, for example, compare average times for completion to target times or past averages to determine if there is a systematic problem. Moreover, the system manager can obtain statistical metrics for any aspect of the system's performance.

The system has been described where the RP, backend applications and the clients are part of the same organization. The invention can also be used where the clients and backend applications are not part of the organization that manages the RP. For example in the banking example given above, the request could initiate directly from a bank customer rather than from a bank branch office. Moreover, the wire transfer request could involve an account that is not part of the bank in which case one or more of the backend applications could be owned by a third party entity.

An enterprise may desire to perform tasks along business units or regional lines. The invention is designed to be sufficiently flexible to handle tasks at whatever level a business unit or the enterprise desires. The hardware system shown in FIG. 1 can be split logically into multiple systems where multiple system administrators using the same physical systems have responsibilities segregated by region, subject matter or the like. Typically, executives, administrators, or other senior managers will receive a summary of information regarding the work flow and will be able to drill down to whatever level of detail they want based on the data stored in common database 108. Database 108 is continually accessed and updated throughout the work flow process.

The system of the invention may also be implemented via the World Wide Web with appropriate security protocols. Clients access the system via a client computing platform. A lightweight directory access protocol (LDAP) server provides authentication when a client logs onto the system. A commercial software product such as SiteMinder™ from Netegrity, Inc., can be used for this purpose. Simple mail transfer protocol (SMTP) server is used to generate outgoing notification E-mail messages at key stages of each process. A corporate directory server provides access to the company's master directory of entities authorized to use the system. An internet protocol (IP) switch, 210, provides load-balancing to direct sessions to one of a plurality of RP's. The switch will be run under the so-called "sticky on=yes" configuration, which assures that once a session is assigned to a portal application server computing platform, the session will continue to work in/from that portal until the session is completed. These servers are the launch point for the system modules and will direct action back and forth among the other servers and databases. The common database which has been previously discussed, is implemented on an SQL server.

Specific embodiments of an invention are described herein. One of ordinary skill in the computing and networking arts will quickly recognize that the invention has other applications in other environments. In fact, many embodiments and implementations are possible. The following claims are in no way intended to limit the scope of the invention to the specific embodiments described above.

What is claimed is:

1. A system comprising:
   a communication interface configured to receive a plurality of different types of work requests from one or more client devices, wherein each work request comprises a request for a particular job to be completed, and wherein completion of the particular job involves completion of two or more actions by two or more backend applications;
   a memory device comprising a plurality of workflow modules stored therein, each workflow module configured to manage a different type of work request, and each workflow module defining the two or more actions to be completed in order to complete the particular job associated with the type of work request that the workflow module is configured to manage; and
   a processor communicatively coupled to the memory device and the communication interface, wherein the processor is configured to:
      receive a first work request from a first client device via the communication interface;
      determine the type of work request that the first work request represents from a plurality of different types of work requests;
      determine a channel flow for the first work request based on a level of risk associated with the first work request;
      select a first workflow module from a plurality of workflow modules stored in the memory device, the selection based on the type of work request and the channel flow determined for the first work request, wherein the first workflow module includes flow logic that defines the two or more actions involved in completing the particular job requested by the first work request;
      transmit a first request to a first backend application to complete at least one of the two or more actions involved in completing the particular job;
      determine, based on a response from the first backend application that the first backend application has completed at least one action but failed to complete all of the actions involved in completing the particular job, one or more remaining actions to complete the particular job and a second backend application that is configured to complete at least one of the one or more remaining actions;
      transmit request to the second backend application to complete the at least one of the one or more remaining actions; and
      monitor whether the first and the second backend applications complete their respective at least one of the two or more actions involved in completing the particular job.

2. The system of claim 1, wherein the processor is configured to receive the first work request from the first client device in a first format, transmit the first request to the first backend application in a second format different from the first format and transmit the second request to the second backend application in a third format different from the first format.

3. The system of claim 2, wherein the processor is further configured to receive a response from the first backend application in the second format and a response from the second backend application in the third format and transmit a client response to the first client device in the first format.

4. The system of claim 1, wherein the first backend application is executed by a processing device separate from the processor and communicatively coupled to the processor via a network.

5. The system of claim 1, wherein the first client and the first backend application are owned by different entities.

6. The system of claim 1, wherein the processor is configured to receive the first work request from the first client device in a first format, wherein, in response to receiving the first work request, the processor is configured to transmit in parallel the first request to the first backend application using a second format different than the first format and the second request to the second backend application using a third format different than the first format and the second format.

7. The system of claim 1, wherein the processor is configured to receive a response from the first backend application related to the first request prior to transmitting the second request to the second backend application.

8. The system of claim 1, wherein the processor is configured to determine whether the particular job requested by the first work request has been completed, and wherein the processor is further configured to use the communication interface to transmit a response to the first client device indicating whether the particular job has been completed.

9. The system of claim 1, wherein the processor is configured to determine, based on a response from the first backend application, that the first backend application has failed to complete the at least one of the two or more actions involved in completing the particular job, and wherein, in response to this determination, the processor is configured to re-send the first request to the first backend application to complete the at least one of the two or more actions involved in completing the particular job.

10. The system of claim 1, wherein the processor is configured to determine that the first backend application has failed to complete the at least one of the two or more actions involved in completing the particular job, and wherein this determination is made by the processor determining that the first backend application has failed to complete the at least one of the two or more actions by a predefined period of time.

11. The system of claim 1, wherein the processor is configured to store information related to the first work request and whether the first work request was completed in a data store.

12. The system of claim 1 further comprising:
a workstation that allows a user to monitor one or more workflow metrics related to one or more work requests received by the processor and responses received by the processor from one or more backend applications.

13. The system of claim 1, wherein the first request comprises a request for a wire transfer, wherein the first workflow module comprises a wire transfer module, wherein the wire transfer module includes instructions for the processor to instruct the first backend application to debit a first account, and wherein the wire transfer module includes instructions for the processor to instruct the second backend application to credit a second account if the processor receives an indication from the first backend application that the first account was successfully debited.

14. A method of managing workflow comprising:
receiving, by a processing device, a work request from a first client input device, wherein the work request comprises a request for a particular job to be completed, and wherein completion of the particular job requires completion of two or more actions; and
managing, by a processing device, one or more attempts to complete the particular job, wherein managing one or more attempts to complete the particular job comprises:
determining a type of request that the work request represents from a plurality of different types of requests;
determining a channel flow for the work request based on a level of risk associated with the first work request;
selecting a first workflow module from a plurality of workflow modules stored in a memory device, the selection based on the type of request that the work request represents and the channel flow, wherein the first workflow module includes flow logic that defines the two or more actions required to complete the particular job;
transmitting a request to a first backend application to complete at least one of the two or more actions required to complete the particular job;
determining, based on a response from the first backend application that the first backend application has completed at least one action but failed to complete all of the actions involved in completing the particular job, one or more remaining actions to complete the particular job and a second backend application that is configured to complete at least one of the one or more remaining actions;
transmitting a request to the second backend application to complete the at least one of the one or more remaining actions; and
monitoring whether the first and the second backend applications complete their respective at least one of the two or more actions required to complete the particular job.

15. The method of claim 14, wherein the first backend application is executed by a processing device separate from the request processor and communicatively coupled to the request processor via a network.

16. The method of claim 14, further comprising:
receiving, by a processing device, the first work request from the first client input device in a first format;
transmitting, by a processing device, the first request to the first backend application using a second format different than the first format; and
transmitting, by a processing device, the second request to the second backend application using a third format different than the first format and the second format.

17. The method of claim 14, further comprising:
determining, by a processing device, whether the particular job requested by the work request has been completed, and
transmitting, by a processing device, a response to the first client input device, the response indicating whether the particular job has been completed.

18. The method of claim 14, further comprising storing, in a data store, information related to the work request and whether the work request was completed.

19. A computer program product for managing workflow comprising a non-transitory computer-readable medium having computer-executable instructions embodied therein, which, when executed by a computer cause the computer to perform the following steps:
receiving a plurality of work requests from one or more client input devices, wherein each work request comprises a request for a particular job to be completed, and wherein completion of each particular job requires completion of two or more actions;
determining a type of request for each of the plurality of work requests from a plurality of different types of requests;
determining a channel flow for each of the plurality of work requests based on the level of risk associated with each request;
selecting for each of the plurality of work requests a workflow module from a plurality of workflow modules, each selection based on the type of request and channel flow determined for each work request, wherein each workflow module includes flow logic that defines the two or more actions required to complete the particular job of the associated work request;
transmitting a request to a first backend application to complete at least one of the two or more actions required to complete the particular job;
determining, based on a response from the first backend application that the first backend application has completed at least one action but failed to complete all of the actions involved in completing the particular job, one or more remaining actions to complete the particular job and a second backend application that is configured to complete at least one of the one or more remaining actions;
transmitting a request to the second backend application to complete the at least one of the one or more remaining actions; and monitoring whether the backend applications complete all of the two or more actions required to complete the particular job associated with each of the plurality of work requests.

20. The computer program product of claim 19, wherein the computer is caused to further perform:
receiving a plurality of different work requests from the one or more client input devices in a first one or more formats;
transmitting a first request to a first backend application using a second format different than the first one or more formats; and
transmitting a second request to a second backend application using a third format different than the first one or more formats and the second format.

21. The computer program product of claim 19, wherein the plurality of workflow modules are stored on the computer-readable medium.

22. The computer program product of claim 19, wherein the plurality of workflow modules comprises at least one workflow module having instructions for completing a banking-related job.

23. The computer program product of claim 22, wherein the banking-related job comprises a wire transfer request, a stop pay order, a balance inquiry, or a draft status inquiry.

* * * * *